United States Patent [19]
Wilda et al.

[11] Patent Number: 5,596,147
[45] Date of Patent: Jan. 21, 1997

[54] COPLANAR PRESSURE SENSOR MOUNTING FOR REMOTE SENSOR

[76] Inventors: Douglas W. Wilda, 2100 Grant Mews, Ambler, Pa. 19002; Charles E. Lane, III, 766 Moredon Rd., Meadowbrook, Pa. 19046; Milton W. Mathias, 5410 N. Norwood La., Plymouth, Minn. 55442

[21] Appl. No.: 559,810
[22] Filed: Nov. 17, 1995
[51] Int. Cl.$^6$ ........................................ G01L 9/00
[52] U.S. Cl. ............................ 73/717; 73/756
[58] Field of Search .................. 73/717, 718, 719, 73/720, 721, 722, 716, 736, 756, 861.61, 861.44, 4 R; 137/597, 886, 343

[56] References Cited

U.S. PATENT DOCUMENTS

| | | | |
|---|---|---|---|
| 4,244,226 | 1/1981 | Green et al. | 73/717 |
| 4,655,074 | 4/1987 | Robertson, Jr. et al. | 73/4 R |
| 4,823,604 | 4/1989 | Silverwater | 73/717 |
| 4,879,912 | 11/1989 | Suckow | 73/756 |
| 5,209,258 | 5/1993 | Sharp et al. | 73/756 |

FOREIGN PATENT DOCUMENTS

| | | | |
|---|---|---|---|
| 0720326 | 3/1980 | U.S.S.R. | 73/756 |
| 1381352 | 3/1988 | U.S.S.R. | 73/756 |

*Primary Examiner*—Richard Chilcot
*Assistant Examiner*—William L. Oen
*Attorney, Agent, or Firm*—Arthur A. Sapelli

[57] ABSTRACT

A pressure transmitter comprises a first housing having a first and second diaphragm for receiving a first and second process fluid under a first and second pressure, respectively. The first and second diaphragm is deflected in response to the first and second pressure of the process fluid. A second housing includes a printed wire board. A first and second capillary tube is included, the first capillary tube being operatively coupled to the first diaphragm and the second capillary tube being operatively coupled to the second diaphragm, each corresponding capillary tube having an internal fluid therein. A sensor package, having a sensor element, is mounted internally within the second housing, and is coupled to the first and second capillary tubes such that the sensor element provides a first signal which is coupled to electrical circuit components mounted on the printed wire board to output a signal representative of the differential pressure of the process fluid.

10 Claims, 6 Drawing Sheets

(SHOWN SKEWED FOR CLARITY)

VIEW A

REAR SUPPORT BLOCK-82 (FRONT SUPPORT BLOCK NOT SHOWN)

VIEW B

COPLANAR PRESSURE SENSOR MOUNTING FOR REMOTE SENSOR

BACKGROUND OF THE INVENTION

The present invention relates to a pressure transmitter assembly, and more particularly to a pressure transmitter assembly configuration for mounting a remote sensor.

In current systems a silicon pressure sensor element is mounted onto a PYREX tube to provide stress isolation between the silicon pressure sensor element and a metal (or plastic) structure. This configuration accommodates mismatches in the thermal coefficient of expansion (TCE) between the materials. By mounting the pressure sensor element onto a PYREX tube, stresses induced by the dissimilar materials are equalized before the stress effects the silicon pressure sensor element (sometimes referred to herein as a silicon die or silicon chip). This arrangement minimizes any errors in measuring the pressure due to the effects of changes in temperature on the mounting joint. The resulting configuration of these present systems result in a long cylindrical column relative to the silicon die, resulting in a structure that is subject to vibration and shock damage. Further, the sensors are generally mounted within the meterbody of the transmitter.

In the present invention the sensor is mounted remotely from the meterbody. Although, in the present invention, there is a pressure connection between the meterbody and the sensor, the sensor has some degree of freedom to accommodate thermal stress, vibration, shock, and other external disturbances. Further, the pressure sensor of the present invention is a single piece of silicon having a standard DIP configuration, resulting in a standard, easier mounting arrangement.

SUMMARY OF THE INVENTION

Thus there is provided by the present invention, a transmitter having a sensor mounting remote from the meterbody. A pressure transmitter of the present invention comprises a first housing having a first and second diaphragm for receiving a first and second process fluid under a first and second pressure, respectively. The first and second diaphragm is deflected in response to the first and second pressure of the process fluid. A second housing having a printed wire board housed therein permits mounting electrical circuit components thereon. A first and second capillary tube is included, the first capillary tube being coupled to a first chamber formed by the first diaphragm and the second capillary tube being coupled to a second chamber formed by the second diaphragm. Each chamber and corresponding capillary tube has an internal fluid therein. A sensor package, having a sensor element is mounted internally to the second housing. The sensor package is coupled to the first and second capillary tubes such that the sensor element provides a first signal representative of the difference in pressure of the internal fluid of the capillary tubes. The first signal is coupled to electrical circuit components mounted on the printed wire board to output a second signal indicating a difference between the first and second pressure of the process fluid.

Accordingly, it is an object of the present invention to provide a transmitter assembly having a sensor mounted remotely from the meterbody.

This and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 5, which comprises

DETAILED DESCRIPTION

Figure 1:
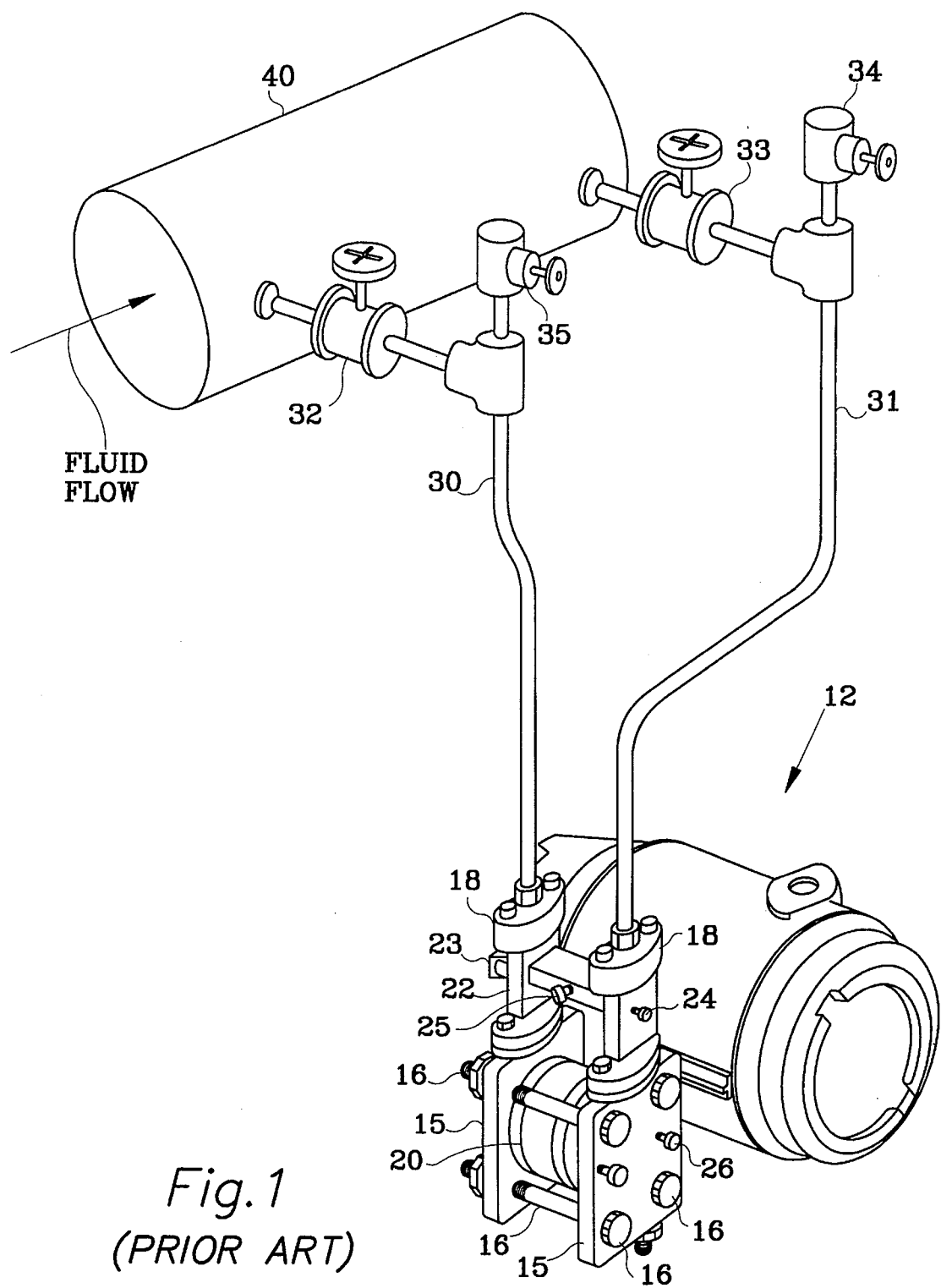
FIG. 1 shows a transmitter of the prior art connected to a pipeline.

Referring to FIG. 1, there is shown a transmitter connected to a pipeline according to the prior art, including the mounting flanges and valves. A typical pressure transmitter of the prior art 12 has two heads 15 (differential pressure model) which are bolted together by a bolt 16 to provide a pressure tight enclosure around a meterbody 20. These heads are then attached to the manifold 22. The manifold 22 holds three valves 23, 24, 25 for isolation of the transmitter 12 and the process, and for calibration of the transmitter 12 in place. Each transmitter process head 15 often contains a vent/drain valve 26 to allow trapped gasses to be vented from a liquid line, and alternatively, condensed liquids from a normally gas-filled line. Process lines 30, 31 include a second valve 32, 33 in each process line, respectively. The process lines 30, 31 connect to a pipeline 40 having a fluid of a process being carried therein. Vent valves 34, 35 can be included. The typical transmitter 12 includes a sensor element (not shown) enclosed within the meterbody 20 and includes an electronics module portion 45, the meterbody being connected to the electronics module 45.

Figure 2:
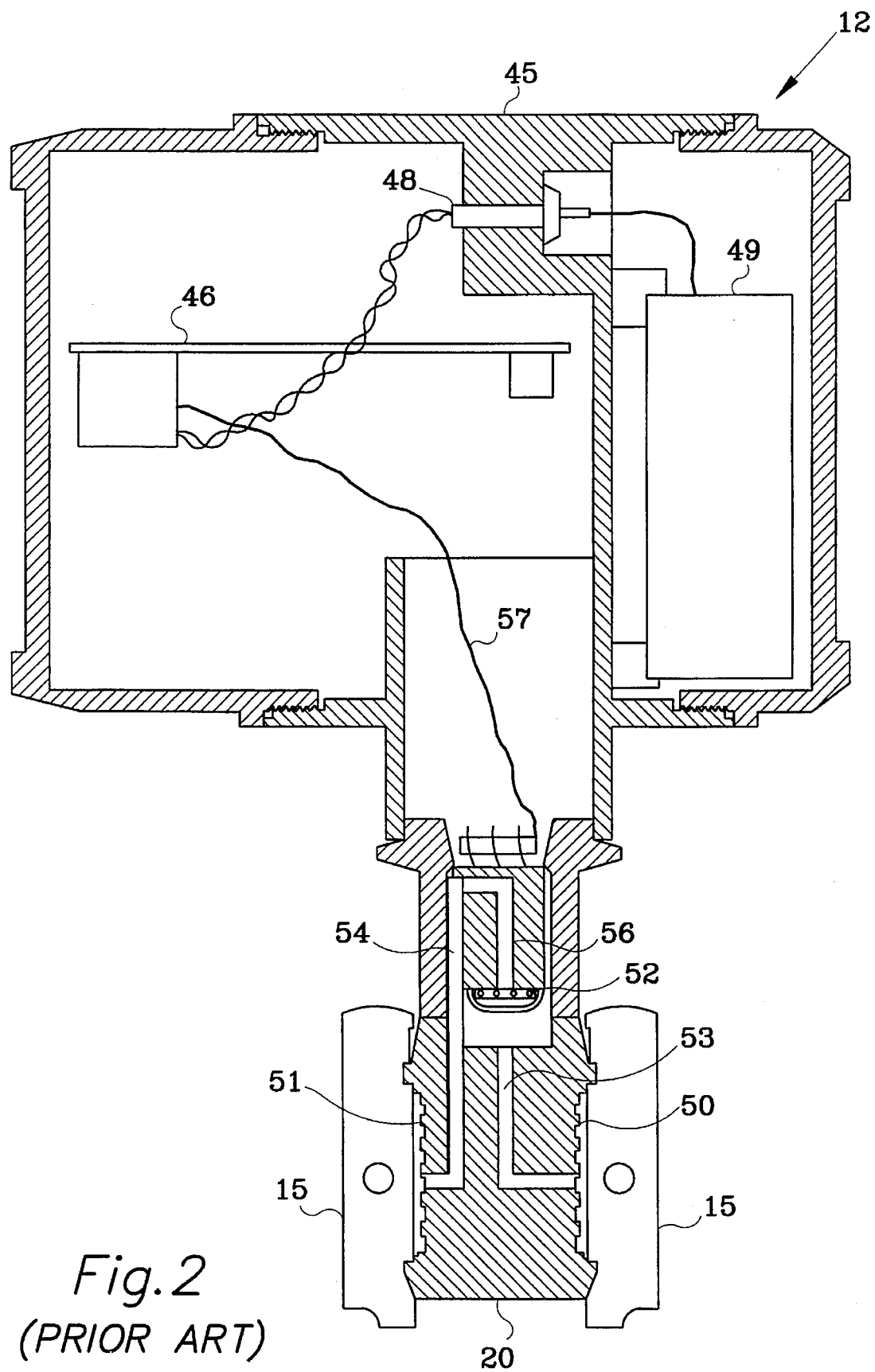
FIG. 2 shows a cross-sectional view of a typical transmitter of the prior art, and more specifically of the transmitter of FIG. 1.

Referring to FIG. 2, there is shown a cross sectional view of the typical transmitter 12 of the prior art, and more specifically of the transmitter as shown in FIG. 1. The meterbody 20 includes diaphragms 50, 51 for sensing the pressure of the fluid inputted to input ports of the meterbody (not shown) via heads 15. (The heads 15 are not cross-hatched for ease of viewing). The meterbody 20 includes internal channels 53, 54 for coupling an internal fluid of the meterbody to a sensor element 56. The sensor element 56 includes a silicon die 53 having diffused thereon elements arranged in a bridge-like configuration and are of a piezo-resistive-type-elements. The internal fluid of the meterbody coupled to the silicon die through the internal channels 53, 54 cause deflection of the silicon die 53 which is sensed by the bridge arrangement and electrical signals generated therefrom are coupled to the electronics housing 45 via conductors 57. Internal to the electronics housing is an electronics module 46 which includes electronic components and includes a microprocessor for processing the signals received from the sensor element 56. An electronic signal indicative of the measured pressure is coupled to a filter element 48 and is then coupled to a terminal block 49 for outputting the signal indicative of the pressure being measured by the sensing element 56 to a process control system (not shown) in a manner well understood by those skilled in the art. A more detailed description of a meterbody configuration housing a sensing element can be had by referring to U.S. Pat. No. 4,841,777, assigned to the assignee of the present application. A more detailed description of the sensor element may be had by referring to U.S. Pat. No. 4,502,335, assigned to the assignee of the present application.

Figure 3:
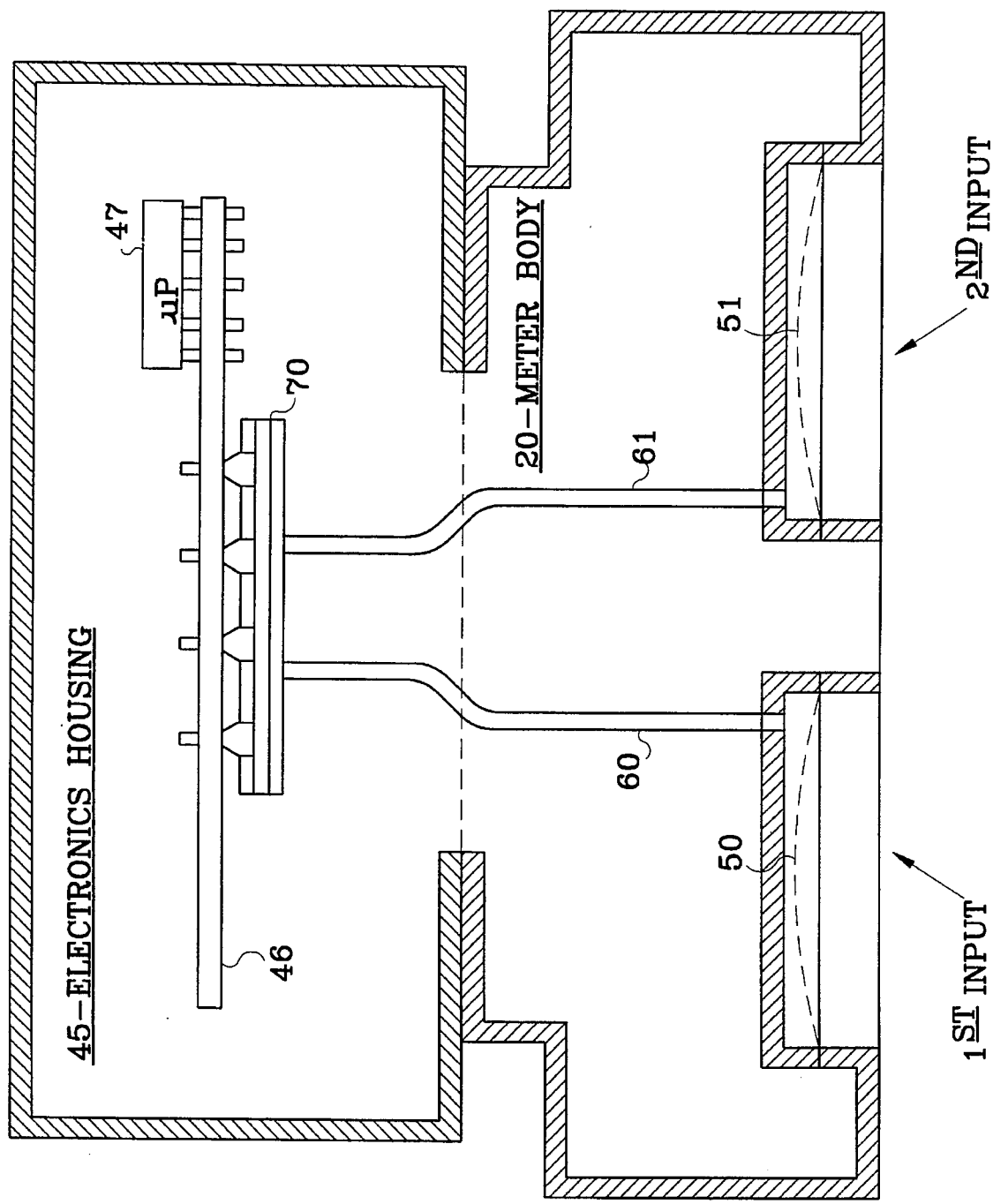
FIG. 3 shows a block diagram view of the transmitter of the present invention.

Referring to FIG. 3, there is shown a block diagram view of the transmitter of the present invention. The meterbody 20 includes a first and second diaphragm 50, 51 of respective input ports (not shown). Deflection of the diaphragms 50, 51 are indicative of the pressure of the fluid under measurement (the configuration shown here is for a differential transmitter). As a result of the deflection of the diaphragms 50, 51, internal fluid within capillary tubes 60, 61 will also be under a pressure. The capillary tubes 60, 61 are coupled to a sensor package 70 having a silicon die therein. The internal fluid of the first capillary tube 60 is directed to a first side of the silicon die (not shown), and the internal fluid of the second capillary tube 61 is directed to a second side of the silicon die. The silicon die has a pressure sensitive coating thereon in the form of piezo resistive elements. The resulting pressure exerted on the first and second side of the silicon die causes a deflection of the silicon die which modifies the piezo resistive component values proportional to the resulting pressure exerted on the silicon die in a manner well known to those skilled in the art. A signal corresponding to the variation is coupled to electronic circuitry (not shown) on the printed circuit board 46, the circuit board 46 including a microprocessor 47 for outputting a resulting signal indicative of the differential pressure measurement. The microprocessor 47 performs scaling, compensation, correction, . . . . The capillary tubes 60, 61 provide a pressure connection between the meterbody and the sensor package 70, the sensor package 70 being included in the electronics housing 45. In this configuration the sensor package 70 has some degree of freedom to accommodate thermal stresses, vibration and shock, and other outside disturbances acting thereon.

Figure 4:
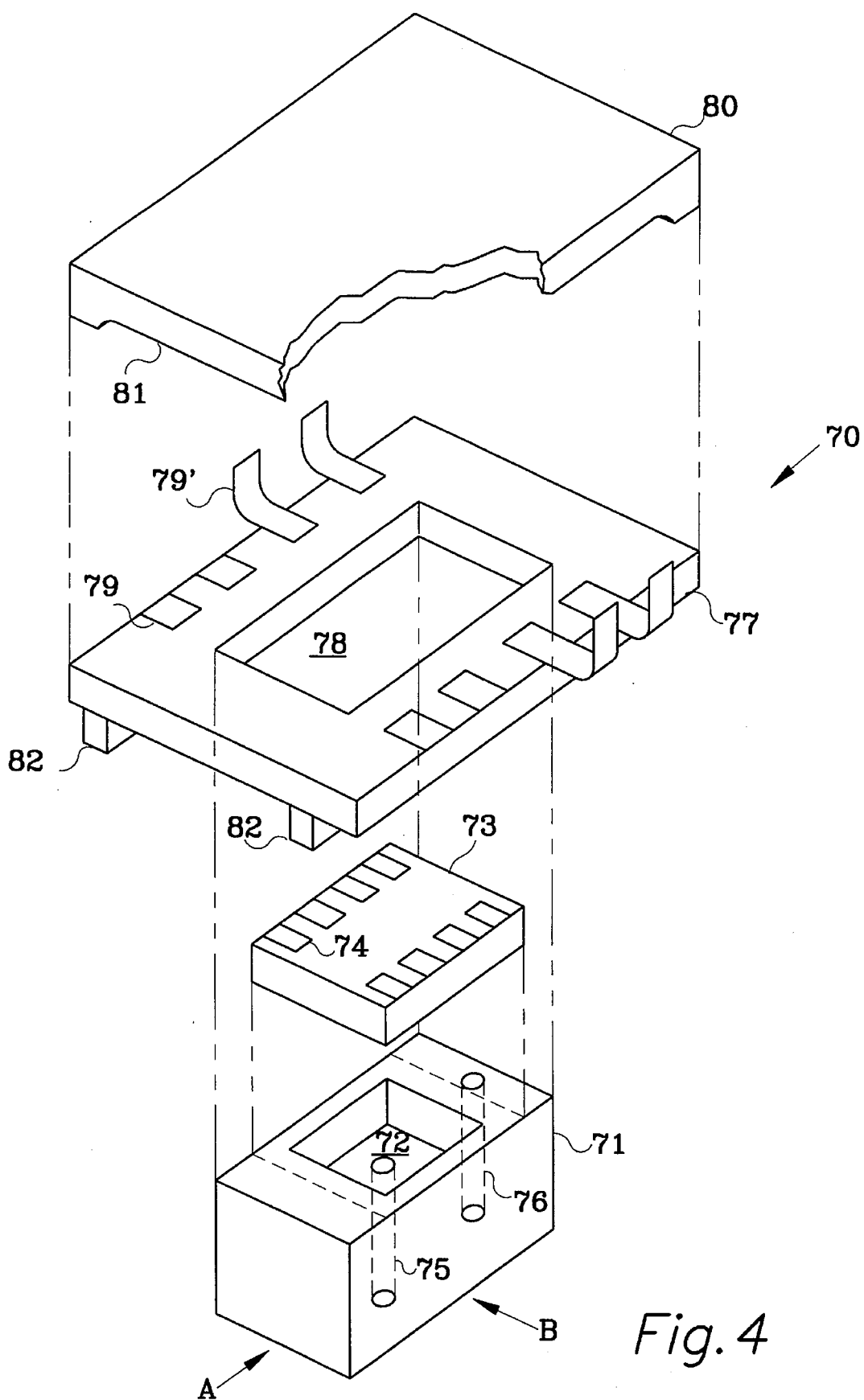
FIG. 4 shows an exploded view of the sensor package utilized in the transmitter of the present invention.

Referring to FIG. 4, there is shown an exploded view of the sensor package 70. The sensor package includes a pedestal 71. In the preferred embodiment the pedestal 71 is a glass-epoxy material (or in an alternative can also be a ceramic material). The pedestal 71 includes a recess 72 over which a silicon chip 73 is placed. The silicon chip 73 includes the pressure sensitive material, in the preferred embodiment, elements of a piezo-resistive-type and include pads 74 for connecting to circuitry outside the sensor package 70. A first channel 75 is included in the pedestal 71 from the bottom surface of the pedestal 71 into the recess 72. A second channel 76 is included in the pedestal from the bottom surface of the pedestal to the top surface of the pedestal in a orientation sufficient such that it is not blocked by the silicon chip which is subsequently attached to the top surface of the pedestal 71 over recess 72. A substrate 77 having an opening 78 which fits over the pedestal 71 is included, the substrate 77 including pads 79 or, as in the preferred embodiment, connections 79' for forming a dual in-line package (DIP) sensor package. The pads 74 of the silicon chip are connected via wires to the respective pads 79, 79'.

A cap 80 is placed on the substrate 77 such that the outer edges of the cap are in line with the outer edges of the substrate. This is not a requirement but for geometric purposes forms a simple package. The cap includes a recessed area also (not shown) for permitting the wires which connect from the pads 74 to the pads of the substrate 79, 79' without interference. The cap 80 also shows a relief feature 81 but is not required. The cap is cemented to the substrate or can be made to snap to the substrate as long as a fluid tight bond is achieved. Thus internal fluid from channel 75 causes deflection of the silicon chip 73 from the underside, and internal fluid included in internal channel 76 causes fluid pressure to be exerted on silicon chip 73 from the topside. The capillary tubes 60, 61, (not shown) are connected to the internal channels 75, 76 by sputtered metallization and solder joints or by any other attaching techniques well known to those skilled in the art. Support blocks 82 are added to provide some rigidity to the substrate.

Figure 5A:
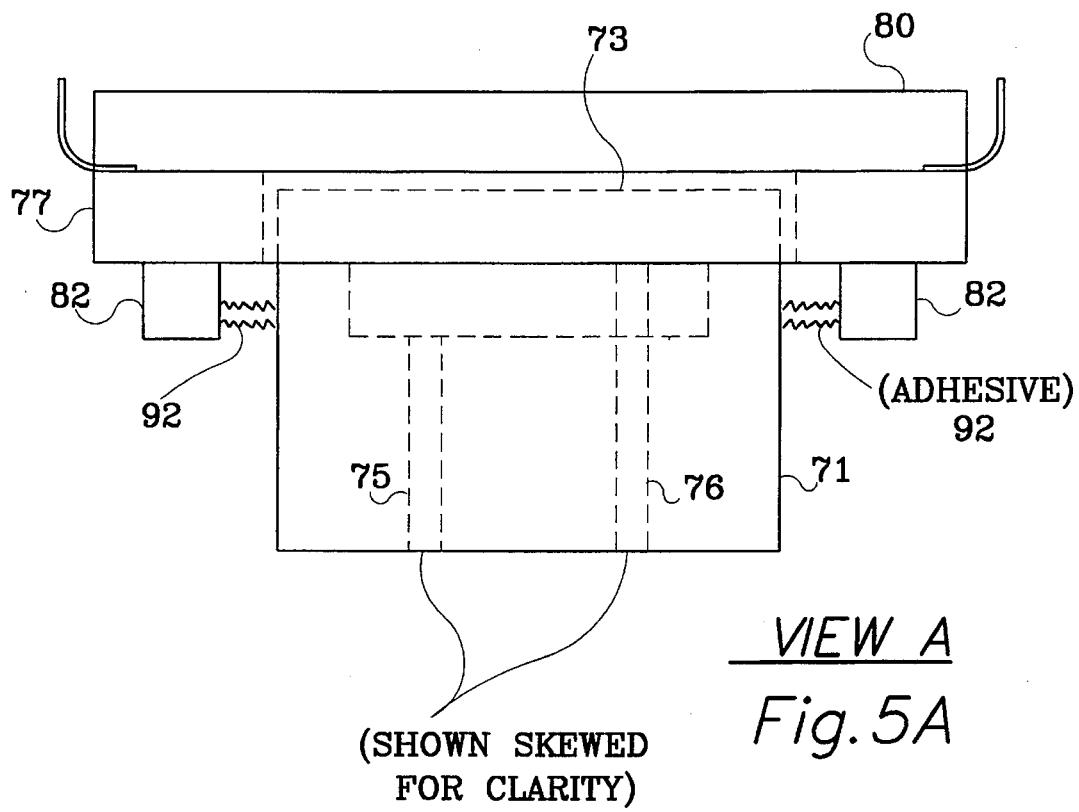
FIGS. 5(a) and 5(b), shows view A and view B, respectively, of FIG. 4.
Figure 5B:
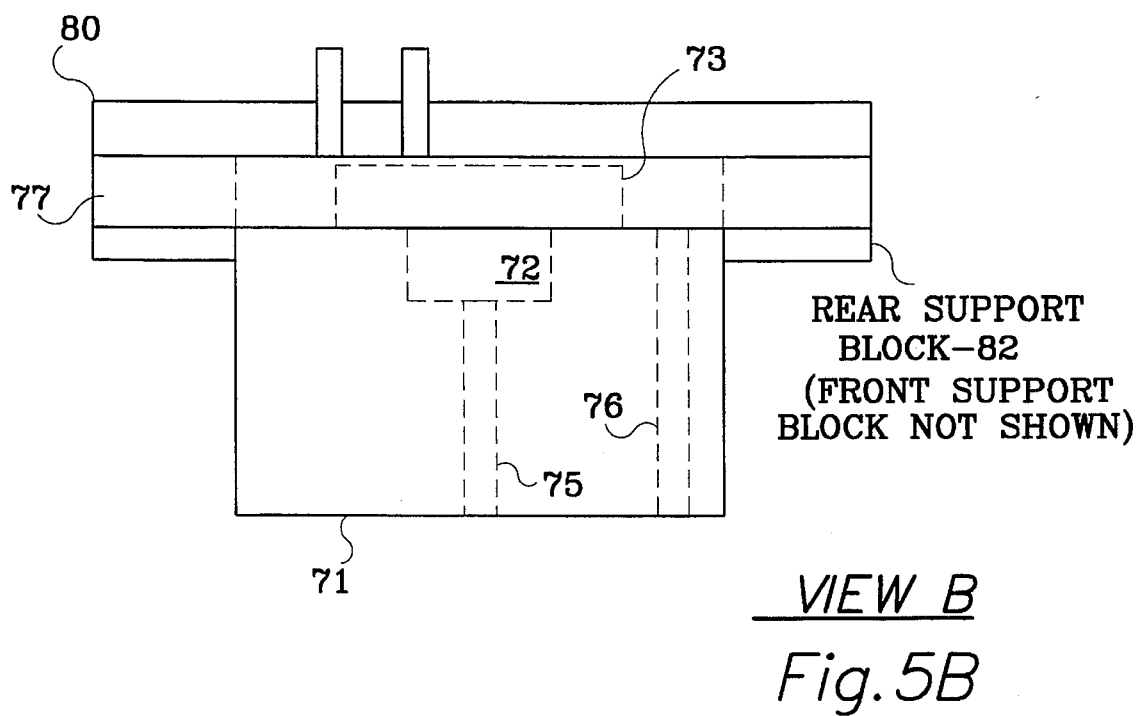

Referring to FIG. 5, which comprises 5(a) and 5(b), there is shown view (a) of the sensor package 70, the view being view (a) of FIG. 4, and FIG. 5(b) shows view (b) of FIG. 4. The substrates are shown including support blocks 82 which include an adhesive between the support block and the pedestal 71. FIG. 5(b) shows the silicon chip 73 placed on pedestal 71 in a manner in which covers the recess 72 such that internal fluid from internal channel 75 is directed to the underside of silicon chip 73 and the internal fluid of second channel 76 is directed to the topside of silicon chip 73. The rear support block 82 is shown only, the front support block being omitted for sake of clarity. FIG. 5(a) shows channels 75, 76 skewed for sake of clarity, but actually may be skewed. Adhesive 92 is shown between the support blocks 82 and the pedestal 71.

Figure 6:
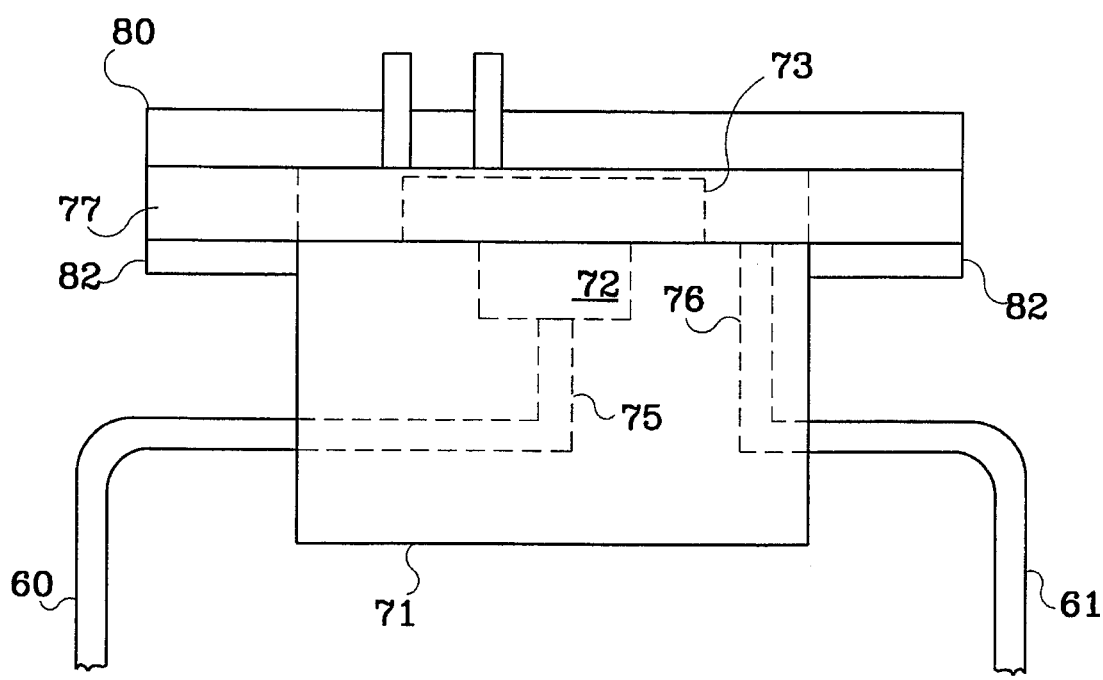
FIG. 6 shows an alternative embodiment of the sensor package of the present invention.

Referring to FIG. 6 there is shown an alternative embodiment of the silicon package 70 in the form of view (b) of FIG. 4. In particular, the internal channels 75, 76 are directed to the sides of the pedestal 71 such that the capillary tubes couple to the pedestal from the side as opposed to the bottom of the pedestal 71. This configuration changes the way internal stresses will propagate to the pedestal 71. Depending on the various applications, absolute pressure measurements, . . . this is a desired configuration. It will be understood by those skilled in the art that a variety of combinations exist of the different surfaces which can be used to couple the capillary tubes. In yet another embodiment, the diaphragms 50, 51 are omitted along with omitting the internal fluid within the capillary tubes for some applications, i.e., for clean/benign process fluids or gases. Thus these clean/benign process gases interact directly with the sensor diaphragm 73.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

We claim:

1. A pressure transmitter, comprising:
   a) a first housing having a first and second diaphragm for receiving a first and second process fluid under a first and second pressure, respectively, the first and second diaphragm being deflected in response to the first and second pressure of the process fluid;
   b) a second housing having a printed wire board housed therein for mounting electrical circuit components thereon;
   c) a first and second capillary tube, the first capillary tube coupled to a first chamber formed by the first diaphragm and the second capillary tube coupled to a second chamber formed by the second diaphragm, each chamber and corresponding capillary tube having an internal fluid therein;

d) a sensor package, having a sensor element, the sensor package mounted internal to the second housing, the sensor package being coupled to the first and second capillary tubes such that the sensor element provides a first signal representative of the difference in pressure of the internal fluid of the capillary tubes, the first signal being coupled to electrical circuit components mounted on the printed wire board to output a second signal indicating a difference between the first and second pressure of the process fluid.

2. A pressure transmitter according to claim 1, wherein said sensor package is mounted on said printed wire board.

3. A pressure transmitter according to claim 2, wherein said sensor package has a dual-in-line package configuration.

4. A pressure transmitter according to claim 3, wherein further processing of said first signal is provided for by said electrical circuit components.

5. A pressure transmitter according to claim 4, wherein said first and second capillary tubes are coupled to a predetermined surface of the sensor package.

6. A pressure transmitter according to claim 5, wherein said predetermined surface of the sensor package is one which permits a direct, shortest path coupling of the capillary tubes to the respective chambers.

7. A pressure transmitted according to claim 4, wherein said first and second capillary tubes are coupled to a first and second surface of said sensor package, the first and second surface being parallel to one another.

8. A pressure transmitter according to claim 4, wherein said first and second capillary tubes are coupled to a first and second surface of said sensor package, the first and second surface being normal to one another.

9. A pressure transmitter, comprising:

a) a housing having a first and second diaphragm for receiving a first and second process fluid under a first and second pressure, respectively, the first and second diaphragm being deflected in response to the first and second pressure of the process fluid;

b) a printed wire board housed in said housing for mounting electrical circuit components thereon;

c) a first and second capillary tube, the first capillary tube coupled to a first chamber formed by the first diaphragm and the second capillary tube coupled to a second chamber formed by the second diaphragm, each chamber and corresponding capillary tube having an internal fluid therein.

d) a sensor package, having a sensor element, the sensor package mounted internally within the housing remote from the first and second diaphragm, the sensor package being coupled to the first and second capillary tubes such that the sensor element provides a first signal representative of the difference in pressure of the internal fluid of the capillary tubes, the first signal being coupled to electrical circuit components mounted on the printed wire board to output a second signal indicating a difference between the first and second pressure of the process fluid.

10. A pressure transmitter, comprising:

a) a first housing having a first and second input port for receiving a first and second process fluid under a first and second pressure, respectively, b) a second housing having a printed wire board housed therein for mounting electrical circuit components thereon;

c) a first and second capillary tube, the first capillary tube coupled to the first input port of said first housing and the second capillary tube coupled to the second input port of said first housing;

d) a sensor package, having a sensor element, the sensor package mounted internal to the second housing, the sensor package being coupled to the first and second capillary tubes such that the sensor element provides a first signal representative of the difference in pressure of the process fluid within the capillary tubes, the first signal being coupled to electrical circuit components mounted on the printed wire board to output a second signal indicating a difference between the first and second pressure of the process fluid.

* * * * *